Aug. 27, 1940.  H. KALSING ET AL  2,212,879
ELECTRIC DISCHARGE LAMP
Filed Aug. 16, 1938
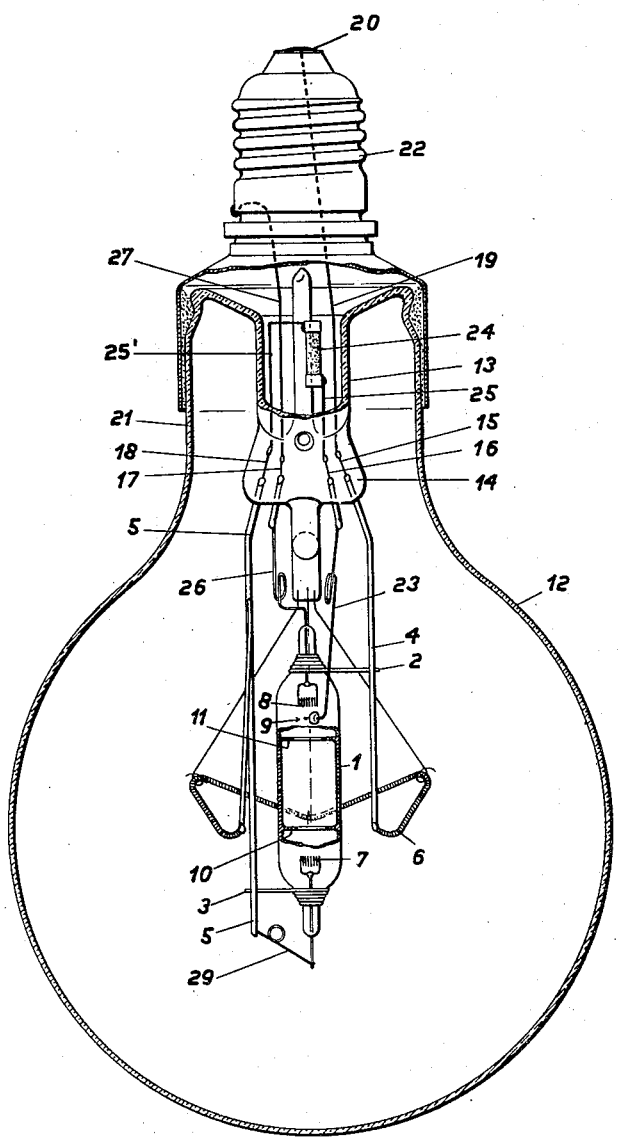
Inventors:
Harry Kalsing,
Hermann Krefft,
Fritz Rössler,
by Harry E. Dunham
Their Attorney.

Patented Aug. 27, 1940

2,212,879

UNITED STATES PATENT OFFICE 2,212,879

ELECTRIC DISCHARGE LAMP

Harry Kalsing, Weisswasser, Hermann Krefft, Berlin-Friedrichshagen, and Fritz Rössler, Berlin, Germany, assignors to General Electric Company, a corporation of New York Application August 16, 1938, Serial No. 225,104
In Germany August 24, 1937

3 Claims. (Cl. 176—1)

Our invention relates to improvements in electric discharge lamps, and more particularly in electric discharge lamps comprising glowing electrodes, a quartz discharge receptacle, and a receptacle enclosing the said quartz receptacle, the quartz receptacle being filled with a suitable vapor at a pressure as high as five atmospheres and more. As is known in the art such lamps emit visible light of high intensity and at high efficiency.

The light emitting column in vapor of such lamps ordinarily has an intense radiation in the ultra-violet region of the spectrum, for example the erythema field, a high ultra-violet emission of the new source of light being desirable for many purposes, for example for domestic illumination with a spectrum similar to that of the sun. Further, by means of the said ultra-violet rays luminescent bodies located away from the lamp may be excited to luminescence, so that the secondary rays emitted thereby and located in the visible region of the spectrum are admixed with the light directly emitted from the lamp. Therefore, it has heretofore been proposed to manufacture also the enveloping container from a glass which permits not only the transmission of visible light rays, but also of ultra-violet rays. For this reason the enveloping container has heretofore been made from glass of high permeability for ultra-violet rays which preferably is perfectly free of iron. But such glass does not withstand for a length of time the transmission of ultra-violet rays, and after a comparatively short time of service, and, frequently after only a few hours, the glass is subject to aging and its permeability is spoiled, the permeability for ultra-violet rays being particularly impaired. However, this aging also extends into the field of the visible rays and results in an undesirable discolouring of the glass and a change in the spectral composition of the radiation.

Our invention is based on the discovery that the said aging of an enveloping container of a two-wall vapor discharge lamp may be avoided or considerably reduced by manufacturing the glass wall of the enveloping container from an alkali-silicate glass containing from 0.02 to 0.4% nickel oxide. This discovery has been proved by many tests made by us.

Notwithstanding careful tests we have not been able to find a satisfactory explanation for the suppression of aging and for maintaining the permeability curve of the alkali-silicate glass by the comparatively slight amount of nickel oxide, and we have found that this effect is not limited to glass of a definite composition, the effect being observed in quite a number of alkali-silicate glasses which are broadly different from one another in their composition and particularly in their alkali-content. We are aware that it has heretofore been known in the art that an addition of from 0.5 to 8% and more of nickel oxide to alkali-silicate glasses does not impair the ultra-violet permeability of the said glass, while it reduces the permeability for visible rays in a degree depending on the nickel oxide content, and that heretofore such alkali-silicate glass having a comparatively high content of nickel oxide of more than 0.5% has been manufactured which has a dark-violet or black colour and which has been used for example for analyses where an ultra-violet radiation was desired, while a visible radiation was not desired.

According as the nickel oxide content of the alkali-silicate glass from which the enveloping container is made is near the lower limit of 0.02% or the upper limit of 0.4%, the said container is either nearly colourless or it has a slight reddish-violet colour. The absorption of visible light rays caused in glasses of the last named class is not objectionable in view of the high intensity of vapor discharge lamps made from quartz and provided with glowing electrodes, and in many cases it is desirable because thereby the blending of the lamp is reduced. This is the case particularly in such lamps in which within the space between the inner discharge receptacle made from quartz and the enveloping container made from glass permeable to ultra-violet rays ordinarily an incandescent wire is located, which ordinarily is used as a resistance in the circuit of the discharge current. In such lamps the said incandescent wire supplements the spectrum, particularly in the red field, and, further, the yellow and green rays of the mercury high pressure discharge which are too intense are weakened by the reddish-violet enveloping container. By combining all these expedients a lamp of high efficiency and mild therapeutic effect is produced which emits light and ultra-violet rays.

For the purpose of explaining the invention an example embodying the same has been illustrated in the accompanying drawing, showing a sectional elevation of the lamp.

In the example shown in the drawing the mercury high pressure lamp comprises a tubular discharge receptacle 1 made from quartz or a glass similar in character to quartz and held in position by means of wires 2, 3 on two rod shaped leads 4, 5 connected with an incandescent wire 6, two glowing electrodes 7, 8 heated by the discharge, and a subsidiary electrode 9 located laterally of the upper glowing electrode 8. Further, the discharge receptacle 1 contains a filling of noble gas and a little mercury, the volume of the said mercury being such that in the operation of the lamp all the mercury is vapourized and superheated to a certain degree. The dimensions and the load of the mercury high pressure vapor lamp are such that in service a vapor pressure preferably of more than five atmospheres is produced within the receptacle 1.

Within the discharge receptacle 1 there are two baffles 10, 11 each formed with a central opening, the said baffles being provided for guiding the discharge between the said electrodes. Around the tubular discharge receptacle 1 there is an incandescent body 6 made from tungsten, and the said receptacle is located centrally within a spherical enveloping container 12, the wall of which is made from an alkali-silicate glass which is permeable to ultra-violet rays and free of iron, and which contains about 0.2% nickel oxide. Preferably the said enveloping container 12 consists of a glass which may readily be worked, and which is composed as follows:

|  | Percent |
|---|---|
| $SiO_2$ | From 60 to 75 |
| $B_2O_3$ | From 0 to 5 |
| $K_2O$ and/or $Na_2O$ | From 10 to 30 |
| Alkaline earth (CaO, MgO, BaO) and/or ZnO | From 3 to 25 |
| NiO | From 0.02 to 0.4 |

The enveloping container 12 is closed at its top by a stem tube 13, and if desired it is filled with an inert gas. Within the pinch 14 of the said tube four leading-in wires 15, 16, 17, 18 are tightly fused. The wire 15 is connected with one end to the rod shaped lead 4 and with its opposite end through a wire 19 to the bottom contact 20 of a base 22 carried by the neck portion 21 of the bulb 12. The wire 16 is connected through a wire 23 to the subsidiary electrode 9 and through a lead 25, a silite resistance 24 and a wire 25' to the leading-in wire 18, the rod shaped lead 5 and the incandescent wire 6. The leading-in wire 17 connects the upper glowing electrode through wires 26, 27 with the sleeve of the base. Preferably the high ohmic resistance 24 is located within the stem tube 13, as is shown in the figure. But it may also be fixed within the container 12.

The current flows from the bottom contact 20 through the wires 19, 15, 4 to the incandescent wire 6 which provides a series resistance for the arc discharge produced between the electrodes 7 and 8, from the said incandescent wire to the rod shaped lead 5, and further on the one hand through the wires 18, 25', 16, 23, the subsidiary discharge gap 9, 8 and the wires 26, 17, 27, and on the other hand through the wire 29, the discharge gap 7, 8 and the wires 26, 17, 27 to the sleeve of the base.

We claim:

1. Electric discharge lamp, comprising a quartz discharge receptacle, glowing electrodes within the said receptacle, and a container enveloping the said receptacle, the said receptacle having a filling of a suitable gas and of metal vapor, and the said container being made from alkali-silicate glass having a content of from 0.02 to 0.4% nickel oxide, said glass being permeable to visible and ultra-violet radiations and being highly resistant to the aging effects of the ultra-violet radiations transmitted by said glass.

2. Electric discharge lamp as claimed in claim 1, in which the wall of the said container is made from a glass which contains, in addition to the said nickel oxide, from 60 to 75% silicic acid, from 10 to 30% alkali and from 3 to 25% alkaline earth, said glass being permeable to visible and ultra-violet radiations and being highly resistant to the aging effects of the ultra-violet radiations transmitted by said glass.

3. Electric discharge lamp, comprising a quartz discharge receptacle, glowing electrodes within the said receptacle, and a container enveloping the said receptacle, the said receptacle having a filling of a suitable gas and of metal vapor of a pressure of more than five atmospheres, and the said container being made from alkali-silicate glass having a content of from 0.02 to 0.4% nickel oxide, said glass being permeable to visible and ultra-violet radiations and being highly resistant to the aging effects of the ultra-violet radiations transmitted by said glass.

HARRY KALSING.
HERMANN KREFFT.
FRITZ RÖSSLER.